Patented Aug. 29, 1933

1,924,767

UNITED STATES PATENT OFFICE 1,924,767

PROCESS FOR THE PRODUCTION OF CARBOXYLIC ACIDS

Gilbert B. Carpenter, Bellemoor, Del., assignor to E. I. du Pont de Nemours & Company, Wilmington, Del., a corporation of Delaware No Drawing. Application August 24, 1931
Serial No. 559,123

13 Claims. (Cl. 260—116)

This invention relates to the synthesis of organic compounds and particularly to the preparation of higher aliphatic acids by the interaction of olefines, carbon monoxide, and steam.

Aliphatic acids of the higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

In my copending application Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide, and an olefine in the presence of a catalyst. Another object of the invention is to provide a process for the preparation of acids having the structural formula $RCH_2COOH$ from steam, carbon monoxide, and an olefinic hydrocarbon, the R indicating a substituted or unsubstituted alkyl or aralkyl grouping. Other objects and advantages will hereinafter appear.

According to the present invention aliphatic carboxylic acids are prepared from steam, carbon monoxide, and an olefinic hydrocarbon by contacting these materials in the vapor phase in the presence of a hydrogen halide and a metallic halide. The metallic halides which are well suited for this purpose include the alkali and alkaline earth metal halides, viz. the bromides, chlorides, and iodides of lithium, sodium, potassium, rubidium, caesium, calcium, strontium, magnesium, and barium as well as the halides of the following metals: tin, iron, cobalt, nickel, bismuth, manganese, lead, tellurium, zinc, and cadmium. The metallic halide may be used alone or admixed with one or more dissimilar metallic halides. It may also be unsupported or supported on activated charcoal, fuller's earth, kieselguhr, etc. The reaction may be effected advantageously, in some instances, by passing the hydrogen halide in the vapor phase together with the gaseous reactants into the catalytic reaction chamber in which the halides of the metals are disposed.

Raw materials suitable for use in the process are readily available from a number of sources, thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 5% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200–400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate one method of practising the invention, although the invention is not limited to the examples:

*Example 1.*—A gaseous mixture containing, by volume, 90 parts carbon monoxide, 5 parts ethylene, and 20 parts steam, is passed together with approximately 5 parts of hydrogen chloride into a conversion chamber containing a zinc chloride catalyst disposed upon activated charcoal. The catalyst is prepared by saturating the activated charcoal with a solution of zinc chloride of sufficient concentration to give a charcoal containing approximately 20% by weight of zinc chloride. The catalyst chamber is designed for carrying out exothermic gaseous reactions and the temperature maintained therein at approximately 325° C. while the pressure is held at approximately 700 atmospheres. The condensate obtained upon cooling the converted gases will give a good yield of aliphatic carboxylic acid containing a high percentage of propionic acid.

*Example 2.*—A gaseous mixture having a composition similar to that employed in Example 1 is passed with a like quantity of hydrogen bromide into a conversion chamber containing sodium bromide. By maintaining a temperature of approximately 300° C. and a pressure in the neighborhood of 600 atmospheres a good yield of propionic acid will be realized.

*Example 3.*—Propionic acid together with other aliphatic carboxylic acids can be obtained by employing hydrogen chloride and calcium chloride as the associated catalysts for the reaction using the temperature and pressure conditions as well as the same gaseous mixture that is used in Example 1.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of the equipment acid-resisting alloys of, for example, molybdenum, cobalt, tungsten, chromium, manganese, or nickel.

Various changes may be made in the method hereinbefore described without departing from the invention or sacrificing the advantages thereof.

I claim:

1. In a process of reacting an olefinic hydrocarbon, steam, and carbon monoxide and thereby producing an aliphatic carboxylic acid, the employment of a hydrogen halide and a metal halide as a catalyst for the reaction.

2. In a process of reacting an olefinic hydrocarbon, steam, and carbon monoxide and thereby producing an aliphatic carboxylic acid, the employment as the catalyst for the reaction of a hydrogen halide and a halide of a basic element selected from the following group of elements having an atomic weight from 6–207 consisting of lithium, sodium, potassium, rubidium, caesium, calcium, copper, magnesium, strontium, barium, tin, iron, cobalt, nickel, bismuth, manganese, lead, tellurium, zinc, and cadmium.

3. In a process of reacting an olefine, steam, and carbon monoxide and thereby producing an aliphatic carboxylic acid, the employment of a hydrogen halide and a metal halide as a catalyst for the reaction.

4. In a process of reacting ethylene, steam, and carbon monoxide and thereby producing propionic acid, the employment of a hydrogen halide and a metal halide as a catalyst for the reaction.

5. In a process of reacting ethylene, steam, and carbon monoxide and thereby producing propionic acid, the employment of hydrogen chloride and zinc chloride as the catalyst for the reaction.

6. In a process of reacting ethylene, steam, and carbon monoxide and thereby producing propionic acid, the employment of hydrogen bromide and sodium bromide as a catalyst for the reaction.

7. In a process of reacting ethylene, steam, and carbon monoxide and thereby producing propionic acid, the employment of hydrogen chloride and calcium chloride as a catalyst for the reaction.

8. A process for the preparation of aliphatic carboxylic acids which comprises admixing a hydrogen halide with an olefinic hydrocarbon, carbon monoxide, and steam and passing the resulting gaseous mixture over a catalyst comprising a metal halide.

9. A process for the preparation of propionic acid which comprises admixing a hydrogen halide with ethylene, carbon monoxide, and steam and passing the resulting gaseous mixture over a catalyst comprising a metal halide.

10. In a process of reacting an olefinic hydrocarbon, steam, and carbon monoxide, and thereby producing an aliphatic carboxylic acid, the employment of a hydrogen halide, and a metal halide supported on activated charcoal as a catalyst for the reaction.

11. In a process of reacting an olefine, steam, and carbon monoxide, and thereby producing an aliphatic carboxylic acid, the employment of a hydrogen halide and a metal halide supported on activated charcoal as a catalyst for the reaction.

12. In a process of reacting ethylene, steam, and carbon monoxide, and thereby producing propionic acid, the employment of hydrogen chloride and zinc chloride supported on activated charcoal as the catalyst for the reaction.

13. A process for the preparation of aliphatic carboxylic acids which comprises admixing a hydrogen halide with an olefinic hydrocarbon, carbon monoxide, and steam, and passing the resulting mixture over a catalyst comprising a metal halide supported on activated charcoal.

GILBERT B. CARPENTER.